(12) United States Patent
Ekpenyong et al.

(10) Patent No.: US 11,416,423 B2
(45) Date of Patent: Aug. 16, 2022

(54) TRACKING MOVEMENTS OF ENROLLED PERIPHERAL DEVICES

(71) Applicant: NCR Corporation, Atlanta, GA (US)

(72) Inventors: Olufisayo Adebanke Ekpenyong, Kitchener (CA); Rhonda Lee Henderson, Kitchener (CA); Nazmu M. Nazarali, Waterloo (CA); Darryl Scott O'Neill, Waterloo (CA)

(73) Assignee: NCR Corporation, Atlanta, GA (US)

( * ) Notice: Subject to any disclaimer, the term of this patent is extended or adjusted under 35 U.S.C. 154(b) by 141 days.

(21) Appl. No.: 16/902,572

(22) Filed: Jun. 16, 2020

(65) Prior Publication Data
US 2021/0390064 A1 Dec. 16, 2021

(51) Int. Cl.
| | | |
|---|---|---|
| *G06F 13/10* | (2006.01) | |
| *G06F 9/4401* | (2018.01) | |
| *G06F 9/445* | (2018.01) | |
| *G06F 16/955* | (2019.01) | |
| *G07G 1/14* | (2006.01) | |
| *G06F 21/62* | (2013.01) | |

(52) U.S. Cl.
CPC .......... *G06F 13/102* (2013.01); *G06F 9/4411* (2013.01); *G06F 9/44505* (2013.01); *G06F 16/955* (2019.01); *G06F 21/62* (2013.01); *G07G 1/14* (2013.01); *G06F 2221/2141* (2013.01)

(58) Field of Classification Search
CPC .... G06F 13/102; G06F 16/955; G06F 9/4411; G06F 9/44505; G06F 21/62; G06F 2221/2141; G07G 1/14
See application file for complete search history.

(56) References Cited

U.S. PATENT DOCUMENTS

| | | | | |
|---|---|---|---|---|
| 6,311,165 | B1 * | 10/2001 | Coutts | G06Q 20/1085 235/379 |
| 8,032,353 | B1 * | 10/2011 | Baron | G06F 3/162 703/24 |
| 2010/0306418 | A1 * | 12/2010 | Anson | G06F 9/4411 710/8 |
| 2020/0220621 | A1 * | 7/2020 | Lee | H04N 21/4108 |
| 2020/0288520 | A1 * | 9/2020 | Liu | H04W 76/30 |

* cited by examiner

*Primary Examiner* — Henry Tsai
*Assistant Examiner* — John B Roche
(74) *Attorney, Agent, or Firm* — Schwegman, Lundberg & Woessner (57) ABSTRACT

A peripheral device is tracked between connections to host devices. A peripheral driver is dynamically configured and associated with a peripheral of a host device. A current association between the peripheral device and a current host device is maintained for purposes of providing the peripheral driver of the peripheral device on the current host device to remotely executing applications. The association is dynamically changed/updated based on a connection between the peripheral device and a given host device.

20 Claims, 6 Drawing Sheets

TRACKING MOVEMENTS OF ENROLLED PERIPHERAL DEVICES

BACKGROUND

Peripheral devices are used for a variety of reasons. For example, transaction terminals utilize scanners to perform a variety of transaction-based operations such as item code lookup, check imaging, identification card validation, etc.

A single retailer of Financial Institution (FI) can have multiple retail store or bank branch locations and each location can have multiple transaction terminals, where each transaction terminal includes at least one peripheral scanner. Scanner driver installation can be time consuming; as a result, many retailers or FIs now provide simplified installation utilizing a cloud processing environment. However, each unique scanner has to be appropriately linked to a single unique transaction terminal in order for cloud-based application to properly communicate with the appropriate driver installed on the corresponding transaction terminal.

This presents an issue when scanners are moved from different terminals within a same store or moved across different stores because a moved scanner is not properly associated with the new terminal. The new terminal sees what it believes is a new scanner being connected and attempts to perform a driver installation. Many times, the transaction software of the terminals prevents staff from installing software or drivers and for security reasons require someone with administrative privileges to properly connect the scanner and install the scanner driver on the terminal. This is time consuming and creates unnecessary delays before the scanner can be properly connected and operational on the terminal.

Furthermore, moving scanners from terminal to terminal is a common situation in the industry. A scanner may require maintenance and while it is being serviced a different scanner is interfaced to the terminal that previously used the scanner undergoing the maintenance. In other cases, a terminal may be down (temporarily inoperable), being serviced, being upgraded, being re-imaged, or being removed, such that its previously used scanner is being moved to a different terminal that needs a scanner.

Retailers/FIs want the ability to move scanners and other peripherals around from terminal to terminal and do not want to require someone with administrative privileges to have to install a driver each time a scanner is moved. At the same time, retailers do not want staff without the proper security credentials to be able to install hardware and software on the terminals because this can cause terminal operational issues and/or can expose the terminals to a virus or spyware.

SUMMARY

In various embodiments, methods and a system for tracking movements of an enrolled peripheral device across multiple host devices are presented.

According to an aspect, a method for tracking movements of an enrolled peripheral device across multiple host devices is presented. More particularly, peripheral identifying data is received over a network connection when a peripheral device is connected to a host device. A peripheral driver-to-host device mapping data store is searched for the peripheral identifying data and the peripheral driver-to host device mapping data store is updated based on the searching. A peripheral driver is configured to interface with a user application that remotely executes from the host device over the network connection when the peripheral device is connected to the host device.

DETAILED DESCRIPTION

Figure 1A:
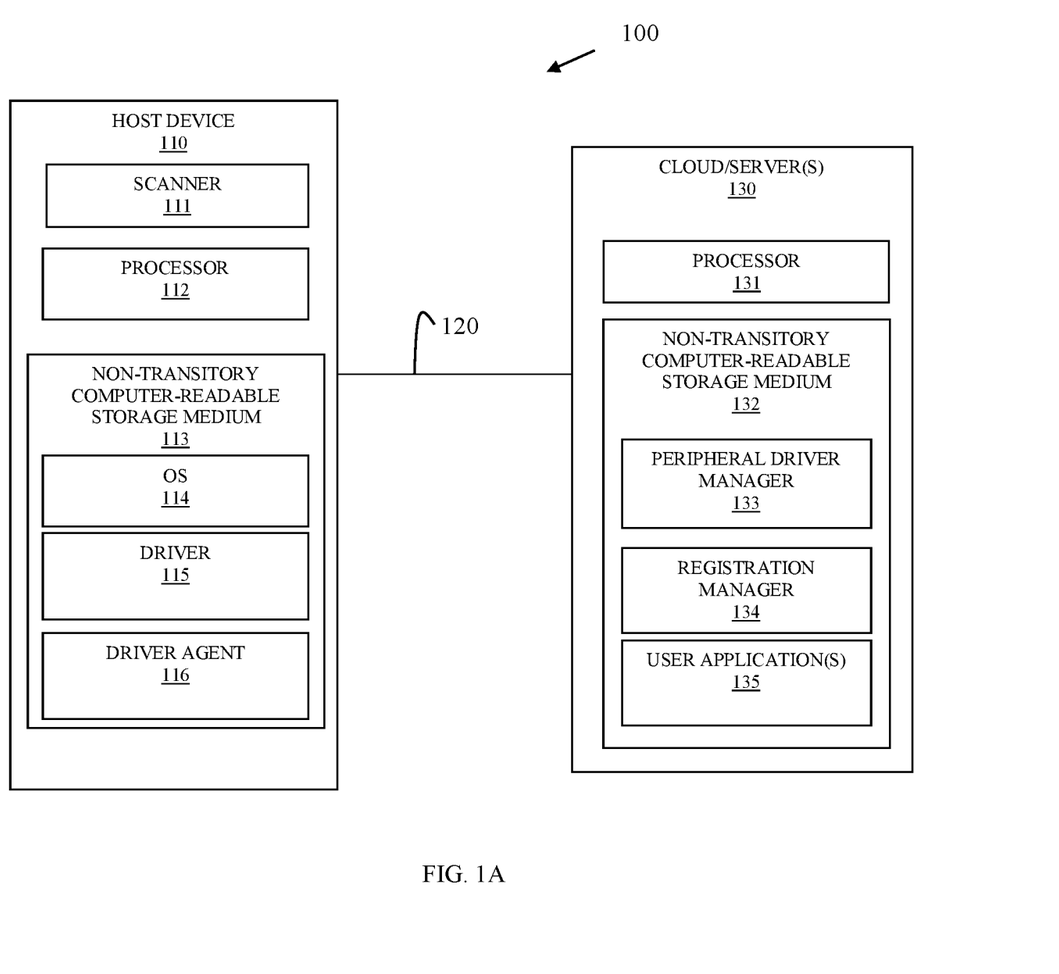
FIG. 1A is a diagram of a system for tracking movements of an enrolled peripheral device across multiple host devices, according to an example embodiment.

FIG. 1A is a diagram of a system 100 for tracking movements of an enrolled peripheral device across multiple host devices, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of tracking movements of an enrolled peripheral device across multiple host devices presented herein and below.

The system 100 tracks movements of peripheral devices from host device to host device. Each host device is enabled to use WebSocket technology running/processing within an Operating System (OS) of the host device to communicate with user-applications that remotely execute on a server/cloud processing environment. Transaction software (one type of a user application (app) executing remotely from the host sends commands to the peripherals through a driver agent of the host, the driver agent uses WebSocket interfaces to communicate with the user app, and the driver agent relays the user app-initiated peripheral instructions received from the user app to the connected peripheral device of the host through the peripheral driver of the host, the driver 115 translates the user app-initiated instructions into low level peripheral instructions, which are provided and executed by the peripheral hardware of the attached peripheral to the host. Similarly, information produced as output from the peripherals are forwarded from the peripheral to the peripheral driver, the driver translates the output and provides user-app data back to the driver agent for delivery to the transaction software that executing remotely from the host. (It is to be noted that other protocols can be used and embodiments herein are not limited to just WebSocket interfaces.)

As will be detailed herein and below, system 100 tracks associations between peripherals and their host devices so that peripherals can be added and removed from the host without user-intervention and without requiring administrative level privileges on the host to properly configure and utilize plug and play peripherals on the host. When a peripheral is moved and connected to a different host device, the peripheral is automatically configured to use the driver without requiring a reinstallation of the driver and the association between the peripheral and its previous terminal is removed and automatically updated with a new association to the new host device. Still further usage metrics and error codes associated with a given peripheral are maintained as that peripheral is freely swapped in an out with different hosts. For example, scanner X may have had 10,000 document scans that spans multiple hosts (5,000 scans occurred on host A and 5,000 scans occurred on host b), the system 100 maintains a total document scan count metric for scanner X when scanner X is moved from host A to host B, such that maintenance schedule for scanner X can be performed based on an accurate number of total scans performed by scanner X. The system 100 accounts for a variety of scenarios detailed herein and below.

As used herein a "host device" refers to a computing device that is directly connected to a peripheral device, such as through a wireless connection or a wired connection (through a wired port, such as a Universal Serial Bus (USB) port). The phrase "host device" may be used interchangeably and synonymously with the phrases and terms "transaction terminal," "terminal," and "workstation."

Although the description that follows utilizes the term "scanner" in connection with the phrases and term "peripheral device" and "peripheral," it is to be noted that embodiments taught herein are not to be so limited, as a "peripheral" or "peripheral device" can include any device that connects to and is a slave to a host device. As such, the peripherals can include card readers (contact-based or contactless), touch displays, non-touch displays, printers, cameras, keyboards, Personal Identification Number (PIN) pads, input styluses, etc.

The system 100 includes a host device 110 and a cloud/server 130 connected through a wired or wireless network connection 120. The host device 110 includes a scanner 111 (one type of peripheral device), a processor 112, and a non-transitory computer-readable storage medium 113 comprising executable instructions representing an OS 114, a driver 115, and a driver agent 116. The executable instructions when executed by the processor 112 cause the processor 112 to perform the processing discussed herein and below with respect to the OS 114, driver 115, and driver agent 116. The cloud/server(s) 130 include a processor 131 and a non-transitory computer-readable storage medium 132 comprising executable instructions representing a peripheral driver manager 133, registration manager 134, and user application(s) 135. The executable instructions when executed by processor 131 from the non-transitory computer-readable storage medium cause the processor 131 to perform the processing discussed herein and below with respect to peripheral manager 133, registration manager 134, and user app(s) 135.

When a new scanner 111 is first used on host device 110, the identifier reported by the scanner 111 when connected and the device type is provided by OS 114 to driver agent 116. Driver agent 116 uses a configuration file present on host device 110 to interact with registration manager 134 over wired or wireless connection 120 (configuration file may be a Uniform Resource Locator (URL) link to registration manager 134 and/or peripheral driver manager 133). This allows a peripheral driver 115 to be associated in cloud 130 with host device 110 and communication between new scanner 111 and host device 110 configured through remotely executed peripheral driver manager 133 utilizing driver agent 116. Driver 115 collects a variety of information that is maintained by peripheral driver manager 133 and registration manager 134 for scanner 111 and host device 110.

Driver agent 116 establishes a WebSocket connection 120 to peripheral driver manager 133/registration manager 135 through OS 114 and obtains the scanner details (transport identifier, serial number, model number, Media Access Control (MAC) address, version number, etc.) for scanner 111, a Globally Unique Identifier (GUID) for driver agent 116, and a Media Access Control (MAC) address for host device 110. Registration manager 135 then generates an enrollment identifier (ID) for scanner 111 and links the enrollment ID for scanner 111 to a host identifier for host device 110.

At this point, the new scanner 111 is serviced on host device 110 by peripheral driver 115. The host ID for host device 110 may also be associated with a specific store location and the known users associated with a given store location, such that known users at a known store are automatically authorized when logged into host device 110 to access scanner 111.

After a given scanner 111 is registered a first time with a given host device 110 and assigned an enrollment ID by registration manager 135, the subsequent movements of scanner 111 can be automatically detected by comparing information stored in a database (by registration manager 135 and/or peripheral driver manager 134) against real-time dynamic information being reported for driver agent 116 for any attached/interfaced scanner 111 to host device 110. So, detection is made when a different scanner 111 is interfaced to host 110 and when the scanner 111 of host 110 is detected as being interfaced to a different host device 110. This detection is of importance because remotely executing user apps 135 need to be able to properly send peripheral commands and obtain peripheral output data from the appropriate scanner 111 that is physically interfaced to the host device 110 being used to access the user apps 135 (access through a web browser of the host device 110—or other devices that are in proximity to the host 110 device and connected to the host device 110, such as a tablet).

System 100 permits a variety of automated scanner movements, where the system 100 automatically locates, configures, and provides an appropriate peripheral driver 115 to user apps 135 from cloud 130 to any newly detected host device-and-scanner association. Enrolled scanners 110 may be moved from a first host device 110 to a second host device 110 automatically; the host device 110 may be reimaged with a new OS 114 such that a new host device ID is reported that is not associated with a known enrolled scanner and the scanner 111 can be automatically re-enrolled; and users associated with specific host devices 110 are automatically authorized for scanner 111 access and deauthorized for access based on the tracked movements of the scanner 111.

System 100 also maintains ongoing aggregate scanner metrics and scanner error codes/events for any given scanner 111 independent of that given scanner's changing association between different host devices. Such aggregate scanner metrics and error codes/events are used for properly determining when a given peripheral 111 requires maintenance, service, and/or media replenishment (such as ink for a peripheral printer 111 and other media based on the type of peripheral 111 being tracked, monitored, and managed.

System 100 provides a considerable amount of automated administrative operations on behalf of an enterprise, such administrative operations permit a scanner 111 to operate without requiring an end user to have installation or administrative access permissions on host device 110 for purposes of activating scanner 111 for use on host device 110 when host device 110 already has driver 115 for a type of scanner 111. This means staff at an enterprise can swap scanners 111 in and out from host devices 110, without a work stoppage being required to wait for an individual with administrative privileges to perform a scanner peripheral driver 133 installation procedure because driver 115 is automatically configured for any attached scanner 111 through agent 116 via a web socket connection 120 to peripheral driver 133/registration manager 134, and once the automated configuration is performed, any remotely executing user app 135 that was initiated via a browser from host device 110 can properly utilize the attached peripheral 111.

It is to be noted that remote users accessing transaction software 134 (one type of user app 134 that processes transactions associated with host device 110) from there user-operated host devices 110 (phones, tablets, laptops, desktops, or wearable processing devices) can connect to cloud server 130 over a network connection 120 and issue commands to scanner 111 on host device 110. Output information from scanner 111 on host device 110 is also properly relayed back to transaction software 134 on cloud/server 130 via network connection 120 (web socket connection 120) by agent 116 of host device 110 for viewing by a user operating on a display of host device 110 through the user application interface of user application 135. In this way, host device 110 may support users logged into host device 110 to perform transaction processing for transactions through connected scanner 110 using wireless connections between remotely executing transaction software 135 of cloud/server 130 and driver 155 through agent 116. Users may use other devices that connect wirelessly to host device 110 to login, such as a tablet or wearable processing device—the login to the host device platform provides access to the connected scanner 110 of host device 110.

Figure 1B:
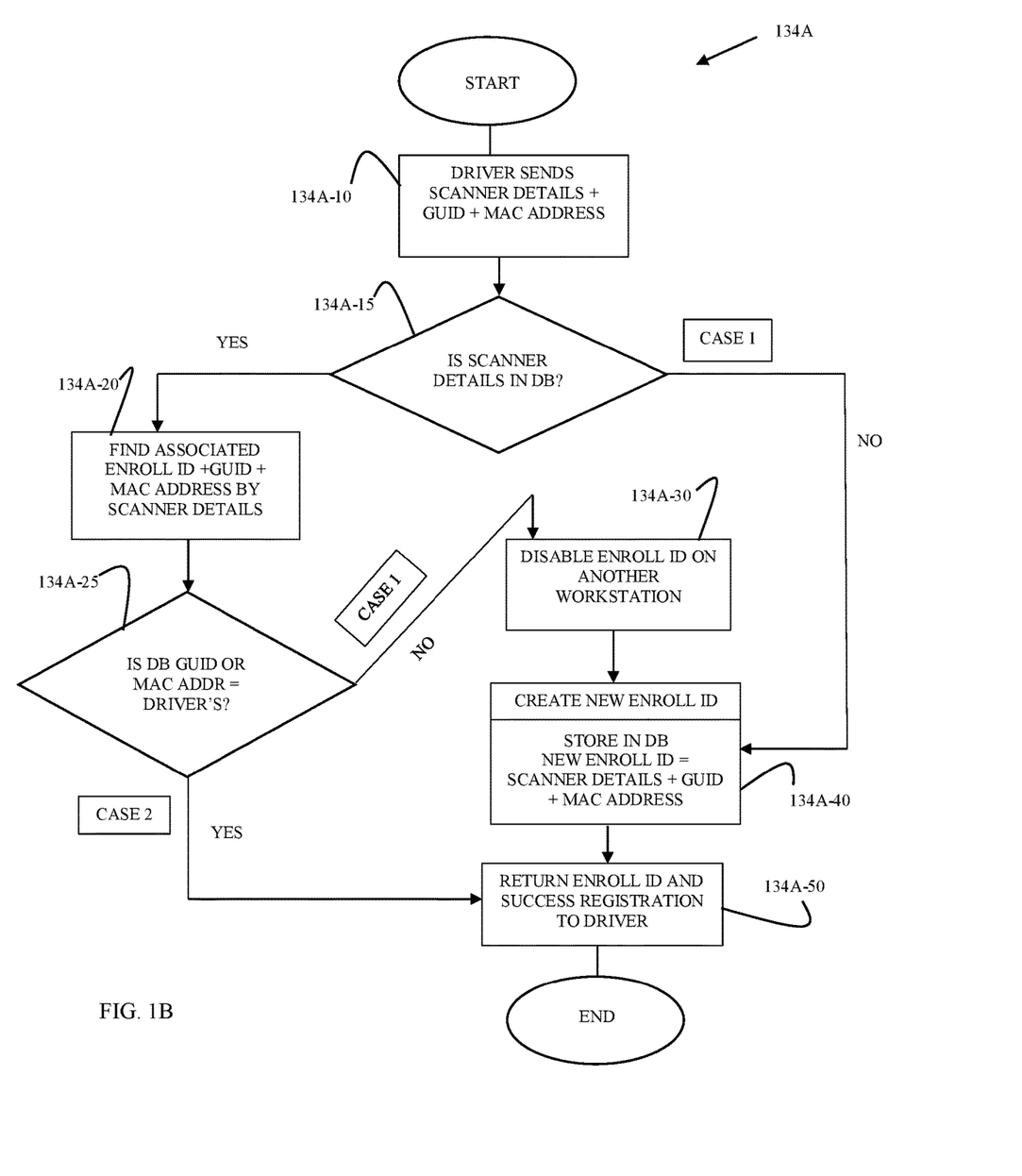
FIG. 1B is a diagram of a method for tracking movements of an enrolled peripheral device across multiple host devices, according to an example embodiment.

FIG. 1B is a diagram of a method 134A for tracking movements of an enrolled peripheral device across multiple host devices, according to an example embodiment. The software module(s) that implements the method 134A is referred to as a "peripheral driver enrollment manager." The peripheral driver enrollment manager is implemented as executable instructions programmed and residing within memory and/or a non-transitory computer-readable (processor-readable) storage medium and executed by one or more processors of a device. The processors that execute the peripheral driver enrollment manager are specifically configured and programmed to process the peripheral driver enrollment manager. The peripheral driver enrollment manager has access to one or more network connections during its processing. The network connections can be wired, wireless, or a combination of wired and wireless.

In an embodiment, the device that executes peripheral driver enrollment manager is cloud/server 130.

In an embodiment, the peripheral driver enrollment manager is all of or some combination of peripheral driver manager 133 and/or registration manager 134.

In an embodiment, a scanner 111 is connected to a host device 110 through a wired connection (such as through a USB port) or a wireless connection.

In an embodiment, host device 110 is an Automated Teller Machine (ATM), a Self-Service Terminal (SST), a Point-Of-Sale (POS) terminal, a tablet computer, a desktop computer, a laptop computer, a Chromebook®, an embedded device (like Windows® on a stick or Raspberry PI®, or a wearable processing device.

At 134A-10, peripheral driver enrollment manager, detects that driver agent 116 has sent scanner details (serial number, version number, model number, etc.), a GUID for driver agent 116, and a MAC address for host device 110. Peripheral driver 115 is activated when the scanner 111 is detected as having connected (wired or wireless) to a host device 110.

At 134A-15, peripheral driver enrollment manager checks to see if the scanner details reported are in a database associated with enrolled scanners of an enterprise.

If the scanner details are found in the database, at 134A-20, peripheral driver enrollment manager finds the scanner's enrollment ID, GUID for the scanner's associated driver 115, and MAC address for the scanner's associated host device 110 using the scanner details to search the database.

Next, at 134A-25, peripheral driver enrollment manager determines if the driver GUID or host MAC address is already associated with and linked to scanner 111, which reported the scanner details (through agent 116) to start with at 134A-10. Assuming this is the case (labeled "case 2" box in FIG. 1B), at 134A-50, peripheral driver enrollment manager returns the corresponding enroll ID and a success registration indication to driver agent 116.

If the reported GUID for driver agent 116 or the reported MAC address for host 110 is not equal to what was found in the database by the peripheral driver enrollment manager, at 134A-25, peripheral driver enrollment manager determines that the scanner 111 is already enrolled but tracked and associated with a different host device 110 from the host device 110 to which the scanner 111 is now attached/interfaced (labeled as "case 1" box in FIG. 1B). At 134A-30, peripheral driver enrollment manager disables the enroll ID on another workstation (different host device 110) in the database, and peripheral driver enrollment manager proceeds to create a new enroll ID for the scanner 111 and the peripheral driver 115 of the current host device 110, at 134A-40.

If the scanner details are not located in the database at 134A-15, peripheral driver enrollment manager, creates a new enroll ID, at 134A-40 and stores in the database the new enroll ID as being equal to the reported scanner details for the scanner 111, the reported GUID for the driver agent 116, and the reported MAC address for the host device 110 (labeled "case 1" box in FIG. 1B). The new enroll ID having the scanner details, agent GUID, and host MAC address are associated with the peripheral driver 115 for the current host device 110 through the enroll ID.

Driver agent 116 writes the enroll ID in a configuration file or in a hidden file on host device 110. So, each host device 110 (workstation 110) that has an enrolled scanner 111 has a unique enroll ID locally stored, which agent 116 uses for reconnecting to cloud/server 130. The enroll ID is useful to ensure that only enrolled scanners are made available for use on the cloud/server 130.

Figure 1C:
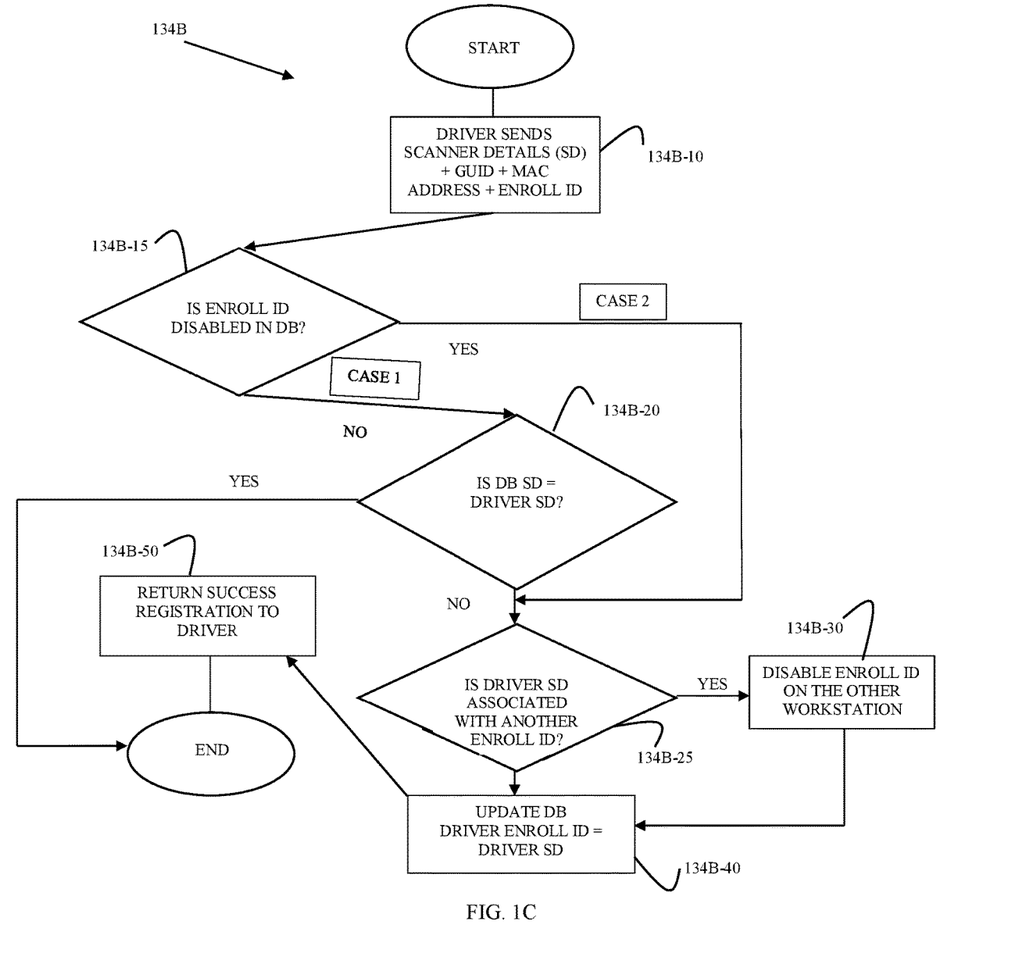
FIG. 1C is a diagram of another method for tracking movements of an enrolled peripheral device across multiple host devices, according to an example embodiment.

FIG. 1C is a diagram of another method 134B for tracking movements of an enrolled peripheral device across multiple host devices, according to an example embodiment. The software module(s) that implements the method 134B is referred to as a "peripheral driver enrollment tracker." The peripheral driver enrollment tracker is implemented as executable instructions programmed and residing within memory and/or a non-transitory computer-readable (processor-readable) storage medium and executed by one or more processors of a device. The processors that execute the peripheral driver enrollment tracker are specifically configured and programmed to process the peripheral driver enrollment tracker. The peripheral driver enrollment tracker has access to one or more network connections during its processing. The network connections can be wired, wireless, or a combination of wired and wireless.

In an embodiment, the device that executes peripheral driver enrollment tracker is cloud/server 130.

In an embodiment, the peripheral driver enrollment tracker is all of or some combination of peripheral driver manager 133 and/or registration manager 134.

In an embodiment, a scanner 111 is connected to a host device 110 through a wired connection (such as through a USB port) or a wireless connection.

In an embodiment, host device 110 is an ATM, SST, a POS terminal, a tablet computer, a desktop computer, a laptop computer, a Chromebook®, an embedded device (like Windows® on a stick or Raspberry PI®), or a wearable processing device.

At 134B-10, the driver 115 associated with a host device 110 having an interfaced or connected scanner 111 is identified by peripheral driver enrollment tracker on cloud 130. The scanner details, enroll ID, agent GUID, and host MAC address are sent by agent 116 and received by peripheral driver enrollment tracker.

At 134B-15, peripheral driver enrollment tracker checks to see if the enroll ID reported is disabled in the database. If the enroll ID is not disabled, at 134B-20, peripheral driver enrollment tracker checks to see if the scanner details associated with the enroll ID in the database are equal to the scanner details provided by agent 116.

Assuming that the enroll ID is in the database and the reported scanner details from agent 116 matches the enroll ID's scanner details in the database, at 134B-20, peripheral driver enrollment tracker ends processing because the scanner is properly associated with its registered host device 111, has a good enroll ID, and has an appropriately assigned driver 115 for operation on host device 110.

Assuming that the scanner details associated with the reported enroll ID is not equal to the reported scanner details, at 134B-20 (labeled "case 1" box in FIG. 1C), peripheral driver enrollment tracker checks to see if the driver scanner details is associated with a different enroll ID, at 134B-25. If this is the case, at 134B-30, peripheral driver enrollment tracker disables the enroll ID on the other workstation 110 (host device 110) through agent 116 and proceeds to 134B-40, which updates the database with enroll ID being set to the driver reported scanner details (which were provided by agent 116 at 135B-10). At 134B-50, peripheral driver enrollment tracker returns a success registration to agent 116 indicating driver 115 is ready to fully service scanner interactions on the current host device 110 from cloud-executed user app 135.

If the reported enroll ID (at 134B-15) was disabled in the database (labeled "case 2" box in FIG. 1C), peripheral driver enrollment tracker proceeds to 134B-25 as discussed above.

FIG. 1B is associated with ensuring a given scanner 111 is enrolled for a cloud-managed driver 115 (part 1 processing).

FIG. 1C is associated with detecting and processing an enrolled scanner's movements (part 2 processing).

Each part (1 and 2) includes one of two cases. For example, part 1 processing case 1 as labeled in FIG. 1B reflects either a new scanner 111 that has never been registered or a scanner 111 that was moved from an original host device 110 to a new host device 110. In either situation, a new enroll ID is created for the scanner 111 and the agent 116 is instructed to write the enroll ID in a hidden file or configuration file on the new host device 110. Assuming, an old enroll ID was found, then the old enroll ID is disabled on the original host device 110 (flagged or removed) in the cloud-maintained database. In part 2 processing case 1 as labeled in FIG. 1C reflects an existing enroll ID processing that gets associated with scanner details when a different scanner 111 is connected to a host device 110.

Part 1 processing case 2 as labeled in FIG. 1B reflects situations associated with a host device 110 being reimaged. When a computer workstation 110 is re-imaged, vital information on the user's workstation 110 to ensure scanner 111 availability on the cloud 130 is lost. The case 2 processing steps of FIG. 1B demonstrate how automatic re-enrollment of the scanner 111 is achieved as soon as the re-imaged workstation 110 is powered on. For example, 1) the driver agent 116 sends the scanner details, agent GUID (new GUID due to re-image), and host MAC address; 2) peripheral driver/registration manager 133/134 looks up the scanner details in the database and find its associated enroll ID and host MAC Address; and 3) peripheral driver/registration manager 133/134 compares the agent's MAC address with the MAC address that is associated with the enrollment in the database. If there is a match, the peripheral driver/registration manager 133/134 returns the enroll ID back to the agent 116 and successfully registers the scanner 111. In a reimaged host device 110, each image will have a same hidden configuration file that points to peripheral driver/registration manager 133/134 but will not have an enroll ID. When the agent MAC address and scanner details match in the database, the agent 116 is instructed to restore the enroll ID on host device 110. Reimaging can occur when a hard drive crashes on host device 110 and is replaced and/or when an OS 114 upgraded is performed on host device 110.

Part 2 processing case 1 as labeled in FIG. 1C reflects situations associated with moving an already enrolled scanner between host devices 110 or the user replaces an enrolled scanner on a given workstation 110. The case 1 processing steps of FIG. 1C demonstrate how scanner movement is tracked and automatically processed: 1) when the user attempts to use the new scanner 111, the agent 116 sends up the enroll ID, scanner details, agent GUID, and host MAC address; 2) peripheral driver/registration manager 133/134 looks up the enroll ID and its scanner details from the database and compares it with the scanner details from the agent 116, a mismatch indicates the scanner 111 has moved and the database will be updated; 3) peripheral driver/registration manager 133/134 then checks if the scanner 111 was previously enrolled on another workstation 110 by checking if the scanner details from the agent 116 is associated with another enroll ID and if so disables the enrollment on the other workstation 110.

Part 2 processing case 2 as labeled in FIG. 1C reflects situations where a user re-attaches a scanner 111 to a workstation 110 with a disabled enrollment ID for a given scanner 111. When a workstation 110 loses its scanner 111 because it was moved elsewhere, system 100 disables the workstation 110 enrollment. If a scanner 111 is later attached to the workstation 110, its enrollment will be re-enabled and remote users will automatically be able to use the scanner again. The processing includes: 1) agent sends enroll ID, scanner details, agent GUID, and host MAC address to the peripheral driver/registration manager 133/134; 2) peripheral driver/registration manager 133/134 looks up enroll ID and finds that it has been disabled (i.e. it has no associated scanner details); and 3) peripheral driver/registration manager 133/134 re-enables the enrollment by associating it with the new scanner details.

System 100 collects and uses the scanner details, agent GUID, host device's MAC address and an enrollment identifier (enroll ID) to be able to detect the movement of scanners 111 (one type of peripheral device as noted above). By collecting similar data, the techniques discussed herein can be applied to other environments to track the movement of any other kind of non-internet-enabled device that can be connected to a computer (or another internet-enabled device—host device 110). The data used are an identifier for the moveable non-internet-enabled device 111, an identifier for the software that directly controls the device (agent 116), an identifier for internet-connected device (host ID for host device 110—host MAC address) and a server-side generated identifier (enroll ID). Storing/Indexing the above data in a database and subsequently using the data to enable automatic re-enrollment of scanners 111 to the cloud 130 when scanners 111 are moved, or when the computers 110 are re-imaged.

This solution ensures that when a scanner 111 is replaced, or the workstation 110 is re-imaged, the re-attached scanner 111 is immediately available for use by host device users without the need to re-enroll. Even though some scanners 111 cannot be directly connected to the internet, system 100 allows administrators to know where scanners 111 are located as they are moved around to various locations within an enterprise or across stores of an enterprise.

Moreover, peripheral driver/registration manager 133/134 maintains peripheral usage metrics and error codes and events independent of the peripheral's association with potentially multiple different host devices 110. That is, aggregated usage metrics and error codes/events for a given scanner 111 are maintained even when the given scanner 111 is attached and removed from multiple different host devices 110.

In an embodiment, host device 110 is an ATM, a POS terminal, a SST, a workstation, a computer, a tablet computer, a Chromebook®, an embedded device (like Windows® on a stick or Raspberry PI®), or a wearable processing device.

In an embodiment, scanner 111 is a type of peripheral device that does not permit network connectivity to the Internet and utilizes the OS 114 of a host device 110 as a proxy between its driver agent 116 and a cloud 130 through a host device wired or wireless connection to cloud 130.

In an embodiment, the driver 115 is remotely executed from the host device 110 on the cloud/server 130.

In an embodiment, one or more of the user applications 135 are executed on the host device 110.

These and other embodiments are now discussed with reference to FIGS. 2-4.

Figure 2:
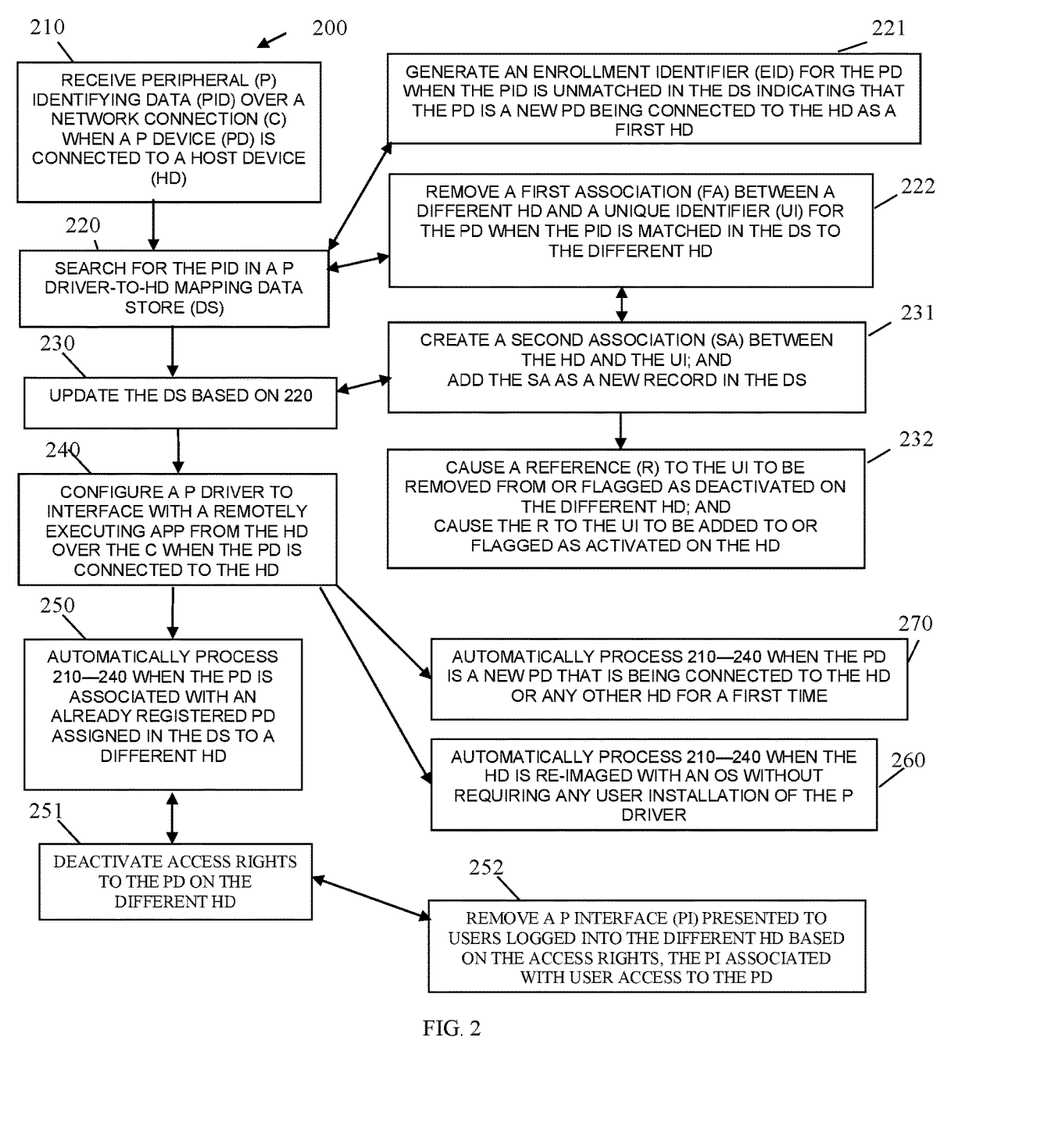
FIG. 2 is a diagram of still another method for tracking movements of an enrolled peripheral device across multiple host devices, according to an example embodiment.

FIG. 2 is a diagram of a method 200 for tracking movements of an enrolled peripheral device across multiple host devices, according to an example embodiment. The software module(s) that implements the method 200 is referred to as a "peripheral-driver tracking manager." The peripheral-driver tracking manager is implemented as executable instructions programmed and residing within memory and/or a non-transitory computer-readable (processor-readable) storage medium and executed by one or more processors of a device. The processor(s) of the device that executes the touchless peripheral-driver tracking manager are specifically configured and programmed to process the peripheral-driver tracking manager. The peripheral-driver tracking manager has access to one or more network connections during its processing. The network connections can be wired, wireless, or a combination of wired and wireless.

In an embodiment, the device that executes the peripheral-driver tracking manager is cloud/server 130.

In an embodiment, the peripheral-driver tracking manager is all of or some combination of 133, 134, method 134A, and/or method 134b.

At 210, the peripheral-driver tracking manager receives peripheral identifying data over a network connection when a peripheral device is connected to a host device. That is, as soon as the host device identifies a connected peripheral device (connected through a wired connection or a wireless connection), the peripheral identifying information provided by the peripheral is forwarded to the peripheral-driver tracking manager over the network connection.

At 220, the peripheral-driver tracking manager searches for the peripheral identifying data in a peripheral driver-to-host device mapping data store.

In an embodiment, at 221, the peripheral-driver tracking manager generates an enrollment identifier for the peripheral device when the peripheral identifying data is unmatched in the mapping data store, which is an indication that the peripheral device is a new peripheral device that is being connected to the host device as a first host device for the peripheral device.

In an embodiment, at 222, the peripheral-driver tracking manager removes a first association between a different host device and a unique identifier for the peripheral device when the peripheral identifying data is matched in the mapping data store to the different host device.

At 230, the peripheral-driver tracking manager updates the mapping data store based on search results associated with the searching at 220.

In an embodiment of 222 and 230, at 231, the peripheral-driver tracking manager creates a second association between the host device and the unique identifier. The peripheral-driver tracking manager, then adds the second association as a new record in the mapping data store.

In an embodiment of 231 and at 232, the peripheral-driver tracking manager causes a reference to the unique identifier to be removed from or flagged as deactivated on the different host device, and the peripheral-driver tracking manager causes the reference to the unique identifier to be added to or flagged as activated on the host device.

At 240, the peripheral-driver tracking manager configures a peripheral driver to interface with a user app that is remotely executing from the host device over the network connection when the peripheral device is connected to the host device. That is, the driver is accessible through the a socket connection to the OS of the host device, such that remotely executed user applications and/or transaction software processing remotely from the host device can issue driver-based commands, and the commands are routed through the socket connection to the host agent 116. The commands are provided by agent 116 to the host peripheral driver where they are translated into low level instructions by the driver and executed by the peripheral. Peripheral device produced data is routed through the peripheral driver, translated to app data, and forward by agent 116 over connection 120 to the user applications and/or transaction software for presentation within a user-application or transaction software interface.

In an embodiment, at 250, the peripheral-driver tracking manager automatically processes 210-240 when the peripheral device is associated with an already registered peripheral device assigned in the mapping data store to a different host device.

In an embodiment of 250 and at 251, the peripheral-driver tracking manager deactivates access rights to the peripheral device on the different host device.

In an embodiment of 251 and at 252, the peripheral-driver tracking manager removes a peripheral interface presented to users logged into the different host device based on the access rights. The peripheral interface associated with user access to the peripheral device. So, users that previously saw and could access the peripheral device from the different host device are unable to see and access the peripheral device when the peripheral device has been removed from a host device.

In an embodiment, at 260, the peripheral-driver tracking manager automatically processes 210-240 when the host device is re-imaged with an OS without requiring any user installation of the peripheral driver.

In an embodiment, at 270, the peripheral-driver tracking manager automatically processes 210-240 when the peripheral device is a new peripheral device that is being connected to the host device or any other host device for the first time.

Figure 3:
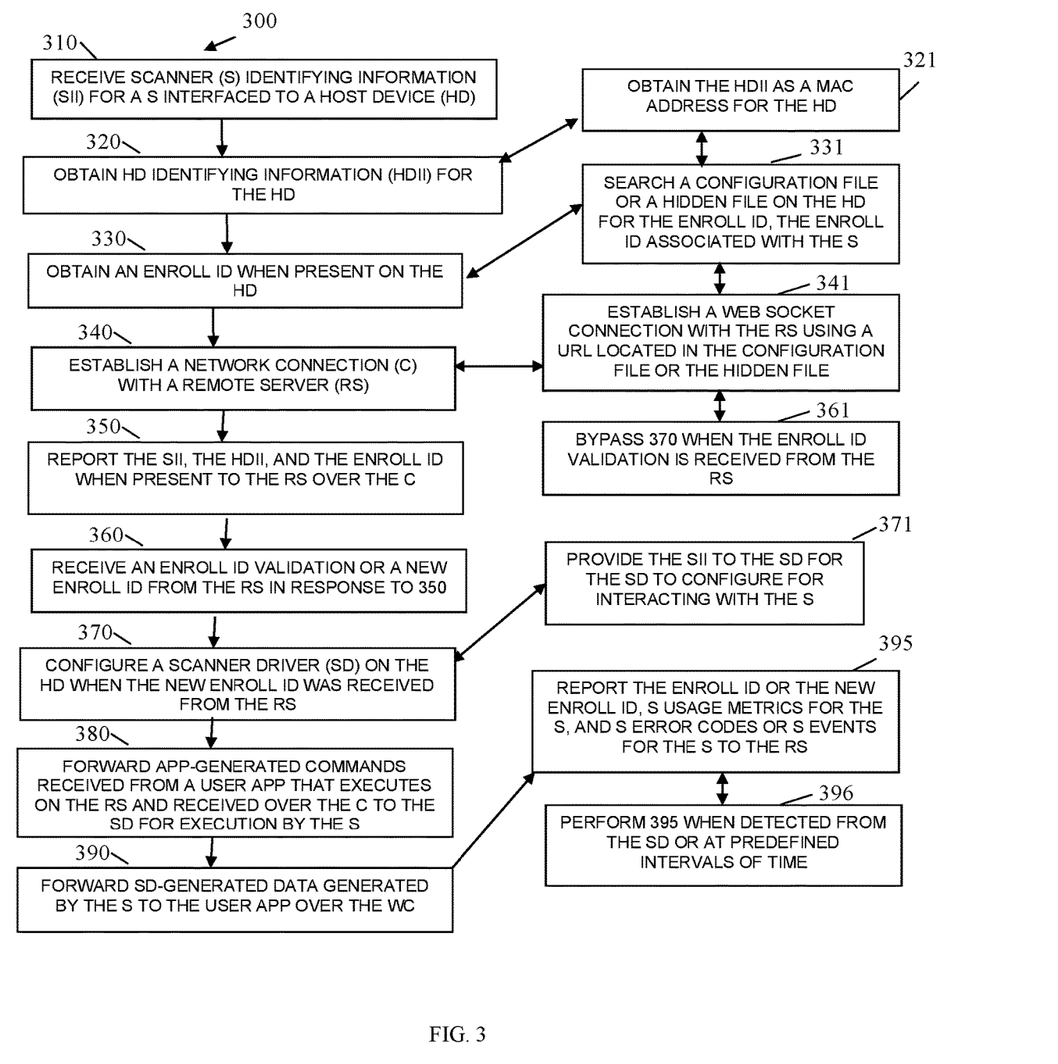
FIG. 3 is a diagram of yet another method for tracking movements of an enrolled peripheral device across multiple host devices, according to an example embodiment.

FIG. 3 is a diagram of another method 300 for tracking movements of an enrolled peripheral device across multiple host devices, according to an example embodiment. The software module(s) that implements the method 300 is referred to as a "peripheral tracker agent." The peripheral tracker agent is implemented as executable instructions programmed and residing within memory and/or a non-transitory computer-readable (processor-readable) storage medium and executed by one or more processors of a device. The processors that execute the peripheral tracker agent are specifically configured and programmed to process the peripheral tracker agent. The peripheral tracker agent has access to one or more network connections during its processing. The network connections can be wired, wireless, or a combination of wired and wireless.

In an embodiment, the device that executes the peripheral tracker agent is host device 110. In an embodiment, host device 110 is an ATM, SST, a POS terminal, a tablet computer, a desktop computer, a laptop computer, a Chromebook®, an embedded device (like Windows® on a stick or Raspberry PI®), or a wearable processing device.

In an embodiment, the peripheral tracker agent is all or some combination of 115 and/or 116.

The peripheral tracker agent presents processing from the perspective of host device 110 when a peripheral is attached to host device 110 to automatically configure and activate a peripheral driver on host device 100 for the newly attached peripheral. The peripheral tracker agent interacts over a network connection (wired or wireless) with methods 134A, 134B, and/or method 200 (described above).

At 310, the peripheral tracker agent receives scanner identifying information for a scanner interfaced to a host device. That is, when a scanner is connected to the host device over a wired connection or a wireless connection and reports at least some of the scanner identifying information, the peripheral tracker agent obtains that information for reporting at 350 below to a remote server or remote cloud.

At 320, the peripheral tracker agent obtains host device identifying information for the host device.

In an embodiment, at 321, the peripheral tracker agent obtains the host device identifying information as a MAC address for the host device.

At 330, the peripheral tracker agent obtains an enroll ID when present on the host device.

In an embodiment of 321 and 330, at 331, the peripheral tracker agent searches a configuration file or a hidden file on the host device for the enroll ID. The enroll ID associated with the scanner.

At 340, the peripheral tracker agent establishes a network connection with a remote server. In an embodiment, the network connection is wireless, wired, or a combination of wired and wireless.

In an embodiment of 331 and 340, at 341, the peripheral tracker agent establishes a web socket connection with the remote server using a URL link located in the configuration file or the hidden file.

At 350, the peripheral tracker agent reports the scanner identifying information, the host device identifying information, and the enroll ID when present to the remote server over the network connection.

At 360, the peripheral tracker agent receives an enroll ID validation or a new enroll ID from the remote server in response to 350.

In an embodiment of 341 and 360, at 361, the peripheral tracker agent bypasses 370 when the enroll ID validation is received from the remote server.

At 370, the peripheral tracker agent configures a scanner driver on the host device when the new enroll ID was received from the remote server.

In an embodiment, at 371, the peripheral tracker agent provides the scanner identifying information to the scanner driver for the scanner driver to configure for interaction with the scanner.

At 380, the peripheral tracker agent forward app-generated commands received from a user app that executes on the remote server and that is received over the network connection to the scanner driver for execution by the scanner or a scanner processor on the scanner.

At 390, the peripheral tracker agent forward scanner driver-generated data generated by the scanner to the user app over the network connection.

In an embodiment, at 395, the peripheral tracker agent reports the enroll ID or the new enroll ID, scanner usage metrics for the scanner, and scanner error codes or scanner events for the scanner to the remote server.

In an embodiment of 395, at 396, the peripheral tracker agent performs the processing at 395 when detected from the scanner driver or at predefined intervals of time.

Figure 4:
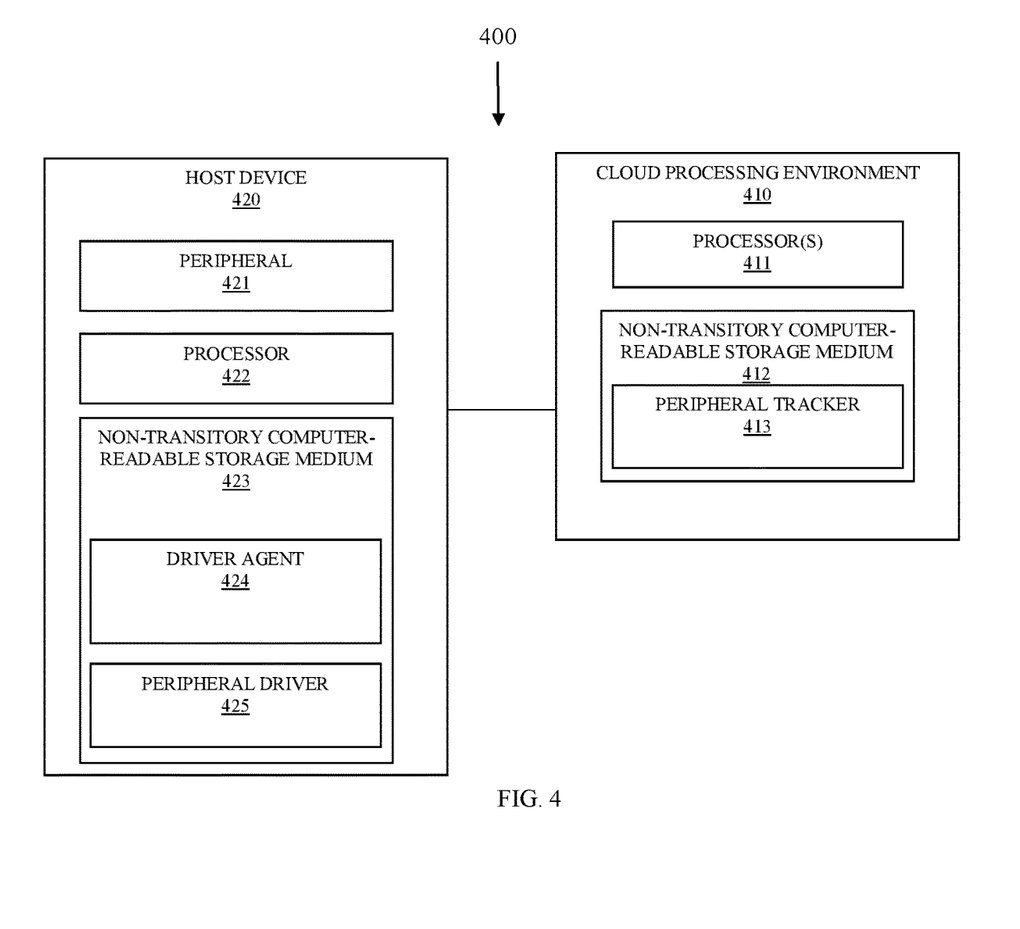
FIG. 4 is a diagram of another system for tracking movements of an enrolled peripheral device across multiple host devices, according to an example embodiment.

FIG. 4 is a diagram of another system 400 for tracking movements of an enrolled peripheral device across multiple host devices, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1A-1C and 2-3.

The system 400 is the system 100.

The system 400 includes a cloud processing environment 410 having at least one processor 411 and a non-transitory computer-readable storage medium 412 comprising a peripheral tracker 413. The system 400 further includes a host device 420. The host device 420 comprises an interfaced peripheral device 421, a host processor 422, a host non-transitory computer-readable storage medium 423 having executable instructions representing a peripheral agent 424 and a peripheral driver 425.

In an embodiment, the executable instructions associated with peripheral tracker 414 are all of or some combination of 133, 134, method 134A, method 134B, and/or method 200.

In an embodiment, host device 420 is host device 110. In an embodiment, host device 110 is an ATM, a POS terminal, a SST, a workstation, a computer, a tablet computer, a Chromebook®, an embedded device (like Windows® on a stick or Raspberry PI®), or a wearable processing device.

In an embodiment, peripheral device 421 is scanner 111. In an embodiment, scanner 111 lacks an ability or software to connect to the Internet.

In an embodiment, peripheral device 421 is a scanner, a printer, an input stylus, a card reader (contact-based or contactless), a touch display, a non-touch display, etc.

In an embodiment, driver agent 424 is driver agent 116 and/or method 300 of FIG. 3.

The host device 420 is configured to relay peripheral information associated with the peripheral device 421 to the peripheral tracker 414 when the peripheral device 421 is connected to the host device 420.

The driver agent 424 when executed by the host processor 422 from the host non-transitory computer-readable storage medium 423 causes the host processor 422 to perform processing comprising: 1) reporting peripheral identifying information for the peripheral device 421 to the peripheral tracker when the peripheral device 421 is connected to the host device 420; 2) reporting host device identifying information to the peripheral tracker 413 when the peripheral device 421 is connected to the host device 420; 3) establish a network connection to the cloud processing environment 410; 4) reporting an enrollment identifier (enroll ID) for the peripheral device 421 to the peripheral tracker 413 over the network connection when present in a file on the host device 420; 5) receiving an enrollment verification from the peripheral tracker 413 or a new enroll ID for the peripheral device 420 from the peripheral tracker 413 over the network connection; 6) providing the peripheral identifying information to the peripheral driver 425 when the new enroll ID is received from the peripheral tracker 413; 7) forwarding user-application (app) generated commands produced by an app that is executed from the cloud processing environment 410 to the peripheral driver 425, wherein the app generated commands are received over the network connection; and 8) forwarding driver generated data produced by the peripheral driver 425 to the app over the network connection.

The peripheral driver when executed by the host processor 422 from the host non-transitory computer-readable storage medium 423 causes the host processor 422 to perform processing comprising: 1) receiving the peripheral identifying information from the driver agent 424 when the new enroll ID is received from the driver agent 424; 2) configuring for interacting with the peripheral device 421 based on the peripheral identifying information when the peripheral identifying information is received from the driver agent 424; 3) translating the app generated commands received from the driver agent 424 into peripheral commands; 3) providing the peripheral commands to the peripheral device 421 for execution on hardware of the peripheral device 421; 4) translating output data produced by the hardware of the peripheral device 421 into the driver generated data; and 5) providing the driver generated data to the driver agent 424.

The peripheral tracker 413 when executed by the at least one processor 411 from the non-transitory computer-readable storage medium 412 causes the at least one processor 411 to perform processing comprising: 1) determining from the peripheral identifying information, the host identifying information and the enroll ID when provided by the driver agent 424 whether the peripheral device 420 is enrolled and assigned to the driver agent 424; 2) generating the new enroll ID when no enroll ID was provided by the driver agent 424 using the peripheral identifying information, the host identifying information and a driver identifier associated with the driver agent 424; 3) removing any linkage and any association between the peripheral identifying information for the peripheral device 421 and a second host device when the linkage and the association are detected; 4) linking the host identifying information, the peripheral identifying information, and the driver identifier; 5) providing the enrollment verification to the driver agent 424 when the peripheral device 421 was determined to already be enrolled and assigned to the driver agent 424; and 6) providing the new enroll ID to the driver agent 424 when no enroll ID was provided by the driver agent 424.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
    obtaining by a processor of a cloud or a server executable instructions from a non-transitory computer-readable storage medium causing the processor to execute the executable instructions and perform operations, comprising:
        receiving peripheral identifying data over a network connection when a peripheral device is connected to a host device;
        searching for the peripheral identifying data in a peripheral driver-to-host device mapping data store;
        updating the peripheral driver-to host device mapping data store based on the searching; and
        configuring a peripheral driver to interface with a user-application remotely executing from the host device over the network connection when the peripheral device is connected to the host device.

2. The method of claim 1 further obtaining by the processor additional executable instructions that cause the processor to perform additional operations comprising automatically processing the method when the peripheral device is associated with an already registered peripheral device assigned in the peripheral driver-to host device mapping data store to a different host device.

3. The method of claim 2, wherein automatically processing further includes deactivating access rights to the peripheral device on the different host device.

4. The method of claim 3, wherein deactivating further includes removing a peripheral interface presented to users logged into the different host device based on the access rights, wherein the peripheral interface is associated with user access to the peripheral device.

5. The method of claim 1 further obtaining by the processor additional executable instructions that cause the processor to perform additional operations comprising automatically processing the method when the host device is re-imaged with an Operating System (OS) without requiring any user installation of the peripheral driver.

6. The method of claim 1 further obtaining by the processor additional executable instructions that cause the processor to perform additional operations comprising automatically processing the method when the peripheral device is a new peripheral device that is being connected to the host device or any other host device for a first time.

7. The method of claim 1, wherein searching further includes generating an enrollment identifier (ID) for the peripheral device when the peripheral identifying data is unmatched in the peripheral driver-to-host device mapping data store indicating that the peripheral device is a new peripheral device being connected to the host device as a first host device.

8. The method of claim 1, wherein searching further includes removing a first association between a different host device and a unique identifier for the peripheral device when the peripheral identifying data is matched in the peripheral driver-to-host device mapping data store to the different host device.

9. The method of claim 8, wherein updating further includes:
creating a second association between the host device and the unique identifier; and
adding the second association as a new record in the peripheral driver-to-host device mapping data store.

10. The method of claim 9 further comprising:
causing a reference to the unique identifier to be removed from or flagged as deactivated on the different host device; and
causing the reference to the unique identifier to be added to or flagged as activated on the host device.

11. A method, comprising:
obtaining by a processor of a cloud or a server executable instructions from a non-transitory computer-readable storage medium causing the processor to execute the executable instructions and perform operations, comprising:
receiving scanner identifying information for a scanner interfaced to a host device;
obtaining host device identifying information for the host device;
obtaining an enrollment identifier (enroll ID) when present on the host device;
establishing a network connection with a remote server;
reporting the scanner identifying information, the host device identifying information, and the enroll ID when present to the remote server over the network connection;
receiving a enroll ID validation or a new enroll ID from the server in response to the reporting;
configuring a scanner driver on the host device when the new enroll ID was received from the remote server;
forwarding application-generated commands from a user application that executes on the remote server and received over the network connection to the scanner driver for execution by the scanner driver; and
forwarding scanner driver-generated data generated by the scanner to the user application over the network connection.

12. The method of claim 11, wherein obtaining the host device identifying information further includes obtaining the host device identifying information as a Media Access Control (MAC) address for the host device.

13. The method of claim 12, wherein obtaining the enroll ID further includes search a configuration file or a hidden file on the host device for the enroll ID, wherein the enroll ID is associated with the scanner.

14. The method of claim 13, wherein establishing further includes establishing a web socket connection with the server using a Uniform Resource Locator (URL) link located in the configuration file or the hidden file.

15. The method of claim 14, wherein receiving further includes bypassing the configuring when the enroll ID validation is received from the remote server.

16. The method of claim 11, wherein configuring further includes providing the scanner identifying information to the scanner driver for the scanner driver to configure for interacting with the scanner.

17. The method of claim 11 further obtaining by the processor additional operations that cause the processor to perform additional operations comprising, reporting the enroll ID or the new enroll ID, scanner usage metrics for the scanner, and scanner error codes or scanner events for the scanner to the remote server.

18. The method of claim 17, wherein reporting further includes performing the reporting of the enroll ID or the new enroll ID, the scanner usage metrics, the scanner error codes or the scanner events when detected from the scanner driver or at predefined intervals of time.

19. A system, comprising:
a host device comprising a host processor and a host non-transitory computer-readable storage medium comprising executable instructions representing a driver agent and a peripheral driver;
a peripheral device that is connected to the host device; and
a cloud processing environment comprising at least one processor and a non-transitory computer-readable storage medium comprising executable instructions representing a peripheral tracker;
wherein the driver agent when executed by the host processor from the host non-transitory computer-readable storage medium causes the host processor to perform processing comprising:
reporting peripheral identifying information for the peripheral device to the peripheral tracker when the peripheral device is connected to the host device;
reporting host device identifying information to the peripheral tracker when the peripheral device is connected to the host device;
establishing a network connection to the cloud processing environment;

reporting an enrollment identifier (enroll ID) for the peripheral device to the peripheral tracker over the network connection when present in a file on the host device;

receiving an enrollment verification from the peripheral tracker or a new enroll ID for the peripheral device from the peripheral tracker over the network connection;

providing the peripheral identifying information to the peripheral driver when the new enroll ID is received from the peripheral tracker;

forwarding user-application (app) generated commands produced by an app that is executed from the cloud processing environment to the peripheral driver, wherein the app generated commands are received over the network connection; and forwarding driver generated data produced by the peripheral driver to the app over the network connection;

wherein the peripheral driver when executed by the host processor from the host non-transitory computer-readable storage medium causes the host processor to perform processing comprising:

receiving the peripheral identifying information from the driver agent when the new enroll ID is received from the driver agent;

configuring for interacting with the peripheral device based on the peripheral identifying information when the peripheral identifying information is received from the driver agent;

translating the app generated commands received from the driver agent into peripheral commands;

providing the peripheral commands to the peripheral device for execution on hardware of the peripheral device;

translating output data produced by the hardware of the peripheral device into the driver generated data; and providing the driver generated data to the driver agent; and wherein the peripheral tracker when executed by the at least one processor from the non-transitory computer-readable storage medium causes the at least one processor to perform processing comprising:

determining from the peripheral identifying information, the host identifying information and the enroll ID when provided by the driver agent whether the peripheral device is enrolled and assigned to the driver agent;

generating the new enroll ID when no enroll ID was provided by the driver agent using the peripheral identifying information, the host identifying information and a driver identifier associated with the driver agent;

removing any linkage and any association between the peripheral identifying information for the peripheral device and a second host device when the linkage and the association are detected;

linking the host identifying information, the peripheral identifying information, and the driver identifier;

providing the enrollment verification to the driver agent when the peripheral device was determined to already be enrolled and assigned to the driver agent; and providing the new enroll ID to the driver agent when no enroll ID was provided by the driver agent.

20. The system of claim 19, wherein the host device is: a Point-Of-Sale (POS) terminal, a Self-Service Terminal (SST), an Automated Teller Machine (ATM), a kiosk, a tablet computer, a laptop computer, a desktop computer, a phone, or a wearable processing device, and wherein the peripheral device is a scanner, a printer, a display, an input stylus, or a card reader.

* * * * *